US007269223B2

(12) United States Patent
Learned et al.

(10) Patent No.: US 7,269,223 B2
(45) Date of Patent: Sep. 11, 2007

(54) SYSTEM AND METHOD FOR INCREASING THROUGHPUT IN A MULTIUSER DETECTION BASED MULTIPLE ACCESS COMMUNICATIONS SYSTEM

(75) Inventors: Rachel E. Learned, Waltham, MA (US); Matthew A. Taylor, Weare, NH (US); Robert B. MacLeod, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 795 days.

(21) Appl. No.: 10/414,738

(22) Filed: Apr. 16, 2003

(65) Prior Publication Data

US 2004/0208251 A1    Oct. 21, 2004

(51) Int. Cl.
*H04L 27/00* (2006.01)
(52) U.S. Cl. .................... 375/259; 375/267; 342/361
(58) Field of Classification Search ............... 375/259, 375/267; 342/361
See application file for complete search history.

(56) References Cited

U.S. PATENT DOCUMENTS

| 5,933,423 A | 8/1999 | Laakso et al. ............ 370/335 |
| 6,122,269 A | 9/2000 | Wales ...................... 370/338 |
| 2003/0026356 A1 | 2/2003 | Brommer |

OTHER PUBLICATIONS

Correal et al., "Enhanced DS-CDMA uplink performance through base station polarization diversity and multistage interference cancellation", GLOBECOM 98. The Bridge to Global Integration. IEEE Global Telecommunications Conference, 1998, vol. 4, Nov. 8-12, 1998 pp. 1905-1910 vol. 4.*
Djonin, "Asymptotical analysis of the optimal spreading sequence allocation in flat fading channels", Vehicular Technology Conference, 2002 Proceedings, VTC 2002-Fall. 2002 IEEE 56th vol. 1, Sep. 24-28, 2002 pp. 582-585.*
European Search Report dated Jul. 12, 2004 of European Application No. EP 04 07 6077 filed Apr. 6, 2004.
G. Mazzini, "Power Division Multiple Access", Universal Personal Communications, 1998 ICUPC '98, XP010314962, US, ISBN: 0-7803-5106-1, pp. 543-546.

(Continued)

*Primary Examiner*—Temesghen Ghebretinsae
*Assistant Examiner*—Juan Alberto Torres
(74) *Attorney, Agent, or Firm*—Malin, Haley & DiMaggio, P.A.

(57) ABSTRACT

The present invention is a digital communication method that increases the overall throughput of a Multiuser Detection (MUD)-based co-channel multiple access (MA) system in terms of the total number of bits transmitted through the shared medium by all the users of the MA system if signals are allowed to interfere. The total number of users can be increased if more dimensions are used for assigning the transmitted signals and the same dimensions are measured at the receiver. Specifically, the present invention does not require any coordination among transmitters but simply requires a transmitter to send its signal with either a randomly chosen polarization ellipse, or an assigned or randomly chosen amplitude level.

45 Claims, 10 Drawing Sheets

OTHER PUBLICATIONS

D. Djonin, et al., "Asymptotic Analysis of the Conventional Decision Feedback Receiver in Flat Fading Channels", 2002 IEEE, XP010589712, US, ISBN: 0-7803-7400-2, Apr. 28, 2002, vol. 1 of 5, pp. 1368-1372.

N. Correal, et al., "Evaluation of Dual Spatial and Polarization Diversity Reception for DS-CDMA Multiuser Detection", Universal Personal Communications, 1998, IEEE, Oct. 5, 1998, US, ICUPC '98, XP010315021, US, ISBN: 0-7803-5106-1, pp. 789-793.

C. Degen, "Performance Evaluation of MIMO Systems Using Dual-Polarized Antennas", XP010638021, ICT-2003, vol. 2, Feb. 23, 2003, pp. 1520-1525.

* cited by examiner

SYSTEM AND METHOD FOR INCREASING THROUGHPUT IN A MULTIUSER DETECTION BASED MULTIPLE ACCESS COMMUNICATIONS SYSTEM

BACKGROUND OF THE INVENTION

1. Field of Invention

This invention relates to digital communication systems, and more particularly to a method and system for increasing the throughput of information bits transmitted on the same channel or frequency in a Multiuser Detection ("MUD") based multiple access communications system by increasing the number of dimensions of each transmitted signal thereby supplying the receivers with additional data in which to decode and detect the incoming transmitted signals.

2. Description of Related Art

Multiple access communication systems allow the transmission of multiple digital data streams between multiple transmitting and receiving devices. Cellular or Personal Communication Systems (PCS) systems provide high quality voice service in a wide-ranging geographical coverage area at relatively low cost. However, since many users transmit energy on the same communications channel, a number of inherent difficulties arise, particularly when a large number of user receivers attempt to detect the information associated with a particular user when there is heavy signal interference created by other users of the system at the same time. Typically the signal of interest cannot be received or the quality of reception is significantly degraded.

One way of solving this problem is to separate the interfering transmissions at the receiver, using signal processing techniques. However, today's current state of the art receivers are not capable of detecting and decoding the information associated with each user under conditions of heavy interference. Another solution to the co-channel interference problem is to decrease the number of users per channel. This, of course, is not an attractive option for telecommunication companies, since obtaining the maximum number of users or managing peak volume transmission periods are important business objectives.

Several techniques have become available in recent years to improve results in co-channel multiple access communications systems. Frequency-Division Multiple Access (FDMA) assigns a different frequency to each user. In a cellular telephone configuration this poses problems because all proximate cells must operate on different frequencies. However, frequency bands may be re-used, provided that the same frequency cells are positioned at a certain distance apart. A further drawback with FDMA schemes is that users will pay full-time for their assigned frequency regardless of their actual use of the system. Additionally, the number of users will be restricted to the number of dedicated frequencies that can be provided and the base station must have one dedicated modem for each user, therefore leading to high hardware and operational costs.

In Time Division Multiple Access (TDMA) technology, multiple channels of data are temporally interleaved, i.e. each signal is assigned to a different time interval and the signals are transmitted individually, according to their assigned time slot. However, in a TDMA system, all transmitters and receivers must have access to a common clock, as time-synchronization among the users is required.

Code Division Multiple Access (CDMA) is another multiplexing technique wherein for each communication channel, the signals are encoded using a sequence known to the transmitter and the receiver for that specific channel. In CDMA, all users use the same frequency at the same time. However, before transmission, the signal from each user is multiplied by a distinct signature waveform. The signature waveform is a signal that has a larger bandwidth than the information-bearing signal from the user. However, in a CDMA system, the total level of co-channel interference limits the number of active users at any instant of time.

Multiuser detection ("MUD") systems take full advantage of all information available at the receiver, by making use of any "knowledge" that the receiver has about the interfering signals. Because the number of users that can be packed into a MUD-based multiple access (MA) system is a function of the number of independent dimensions over which the set of signals is spread (the dimension of the span of the set of signals), the total number of users in the system can be increased if more dimensions are used for transmitting the signals and the same dimensions are accessible at the receiver.

Further, if the received signals are each defined by a polarization ellipse that is unlike the polarization ellipses for the other signals within a given frequency channel, the receiver would have additional data in which to distinguish between similar signals.

In addition to expanding the number of dimensions, favorably "spreading" the received signals out over those dimensions can also allow for increases in the number of users a MUD-based system can accommodate. For example, typical signaling sets for multiuser communications do not include as a free parameter the reference amplitude of each user. In the IS95 code division protocol, amplitude is controlled completely for purposes of power control to meet a signal-to-noise specification (all users ideally being received with the same signal-to-noise ratio (SNR)). By not including amplitude as a potential design choice, the extra advantage offered to the MUD is not exploited. The aggregate throughput of a multiple access system is limited if amplitude is not exploited. Fewer users are supported by MUD-based systems not explicitly controlling user amplitude.

Accordingly, what is needed in the art is a multiuser detection system that supplies one or more additional dimensions such as, for example, a randomly selected polarization ellipse for each signal and an easily achievable, but advantageous, assignment of the value of any variable parameter such as the amplitude (power) of the received signals. In this fashion, because there are an increased number of dimensions or parameters used for assigning the transmitted signals, and the same dimensions or parameters are measured at the receiver, multiple signals transmitted within the same frequency band can be detected and separated thereby allowing for an increase in the total number of users in a given MA system.

It is, therefore, to the effective resolution of the aforementioned problems and shortcomings of the prior art that the present invention is directed.

SUMMARY OF THE INVENTION

The present invention comprises a co-channel digital communication method and system for increasing the throughput of a multi-user detection-based multiple access communications system. The system and method typically includes at least one transmitter for transmitting digitally modulated signals, and at least one corresponding receiver.

The method comprises the steps of representing the set of transmitter signature signals or pulses as a matrix of parameters, assigning at least one additional parameter to each transmitted signature signal, receiving the transmitted signals now including the additional parameter or parameters, and differentiating between similar signals by detecting each signal's assigned additional parameter. The parameters are, for example, polarization orientation and signal amplitude.

As is likely the case in wireless communications, each transmitted signal travels through a unique channel, largely due to the unique set of physical structures that lie between the transmitter and receiver, causing a unique set of multiple paths for each transmitted signal to travel. If the transmitted signals are in any way altered due to channel effects, the signature pulse matrix, S, will be taken to represent the set of received signature signals, which incorporates all characteristics of each user's signature signal, including the value or values of any assigned parameter or parameters.

In one embodiment, the value of the variable parameter is either randomly assigned by a controller or allowed to be independently chosen by each transmitter in a random or an adhoc uncoordinated fashion. In another embodiment, the value of the variable parameter is chosen from a predetermined parameter assignment set either assigned by a controller or chosen by the user randomly or in an adhoc fashion from a predetermined set. The value of the variable parameter can also be chosen and assigned by a controller from an optimized set of parameter assignments that would incorporate knowledge of all users' parameters and, possibly, current performance of the receiver. In yet another embodiment, each user's parameter value is instructed to vary either according to a predetermined map or in a random or adhoc fashion after a given time interval.

Each signal, prior to its transmission or shortly after transmission begins, is assigned or directed to choose at random or from a predetermined list, at least one variable parameter. The control and implementation of the parameter assignment can occur in a variety of ways. A centralized controller may assign the parameter value. This centralized controller may be, for example, the base station, that receives the incoming signals. Prior to receiving the voice or data traffic signal from a user, a signal is transmitted to that user, assigning (either randomly, or in a predetermined manner) one or more parameter values to each transmitter signal.

In another embodiment, the values of the variable parameters are "self-assigned", e.g. each of the transmitters choose the value of the variable parameter/s.

In one embodiment of the invention, the variable parameter is the transmit polarization orientation or polarization ellipse.

In another embodiment, the variable parameter is signal amplitude level.

In yet another embodiment, there is not just one variable parameter. For example there may be two or three parameters that are assigned or arbitrarily chosen such as transmit carrier phase, transmit polarization, and transmit power.

The invention is not limited to the above parameters and it is within the scope of the invention to assign any type of signal parameter to the transmitted signal with the common purpose of increasing the Euclidean distances among neighboring points in the received constellation on which an optimal MUD would operate, either by careful assignment or by instructing transmitters to make arbitrary choices for parameter values. An additional possibility would be to instruct the transmitters to dynamically change the values of the variable parameters either according to some predefined scheme or in an ad-hoc fashion.

The invention comprises a multi-user detection-based multiple access communications system comprising one or more users, each user including a transmitter for transmitting signals, wherein each transmitted signal corresponds to a received signal which is represented as a column in a matrix, S, that incorporates any channel effects as well as values for any variable parameters, a means for assigning one or more variable parameter values to each transmitted signal, one or more receivers, each receiver adapted to detect the signal from one or more transmitters, and means for identifying the total number of transmitted signals and the values of the signal parameters associated with each transmitted signal, optional means for adjusting user parameters to make the received signal constellation corresponding to all possible realizations of the aggregate of all received user signals have less concentrated crowding of hypothesis points to allow the MUD to do a better job differentiating these points and mapping the received point to a highly likely aggregate transmitted set of bit or symbol weights.

It is therefore an object of the present invention to increase the total number of users in a digital communication system packed into a given channel relative to the total number of users participating in any multiuser detection-based system of interfering users.

It is another object of the present invention to improve the performance of any given non-orthogonal multiple access, multiuser detection-based system employed in an interference-ridden scenario.

In accordance with these and other objects, which will become apparent hereinafter, the invention will be described with particular references to the accompanying drawings.

DETAILED DESCRIPTION OF THE PREFERRED EMBODIMENT

The present invention improves upon a fully loaded and/or overloaded multiple access system that uses a multiuser detection based receiver capable of separating signals in heavy interference. The invention is based upon the realization that by increasing the total number of dimensions spanned by a set of received signals, a larger number of signals within a given channel can be properly detected. Therefore, the number of total users packed into a given channel can be increased relative to the number of users participating in any currently deemed satisfactory MUD-system of interfering users. Further, any given multiuser detection based system known to offer good performance in a given interference-ridden scenario can have its performance enhanced (better bit error rates), and/or have its computational complexity reduced by utilizing the present invention.

Every signal in a digital data transmission system includes a specific set of parameters or characteristics that describe the signal. Examples of parameters are timing offset, frequency offset, carrier phase offset, received amplitude, all relative to some reference, channel transfer function, location of training sequence within a data frame, spreading code and or pulse shape. The present invention solves the problem of limited capacity inherent in multi-access systems by requiring each transmitter to send its signal to ensure full and favorable population of all signal dimensions that can be measured at the receiver. Specifically, non-equal polarization ellipses and non-equal received signal amplitudes are the solution. Simply stated, this invention and the embodiments herein, expands the capacity of a communications system by allocating, in an optimized or arbitrary manner, the polarizations and/or amplitudes of user signals in the system so as not to have all users' received powers or polarizations be identical or result in a set of hypothesis points containing multiple ambiguities that even an optimal multiuser detection algorithm could not resolve. These assignments are in addition to any pre-existing assignments of polarization, code, time slot, frequency, oscillation phase, and other parameters.

Additionally, by assigning either an optimized or an arbitrarily chosen amplitude or phase to each signal, or instructing the signals to vary their amplitude and phases over time, any currently deemed satisfactory MUD-enabled system of interfering users will achieve better performance, possibly to the level of being able to afford to pack in many more users than originally thought possible.

Figure 1:
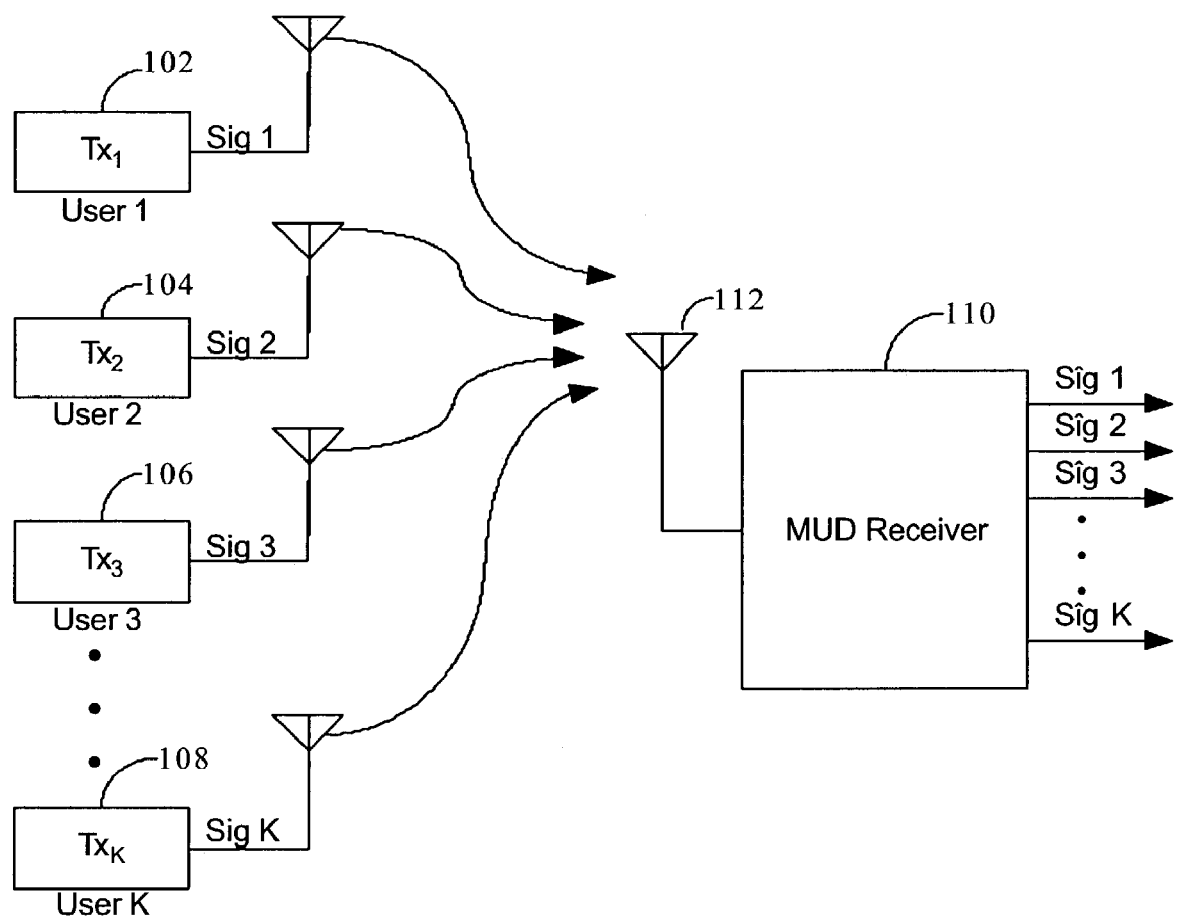
FIG. 1 is a block diagram of a typical (prior art) co-channel MUD-based multi-access communication system.

FIG. 1 shows a block diagram of a typical (prior art) co-channel MUD-based multi-access user communications system 100. In FIG. 1, a plurality of users (represented by User 1-User K) is shown. Each user contains a transmitter (Tx$_1$ through Tx$_K$) 102, 104, 106, 108, which transmits modulated signals to a receiver 110 via antenna 112. FIG. 1 could represent a satellite system where each user is a ground terminal, a cellular telephone where each transmitting user represents a cellular telephone or a cable modem scenario where multiple signals are being sent through a common conduit, i.e. a cable. In each case, the possibility of signal interference is high in a co-channel environment.

Figure 2:
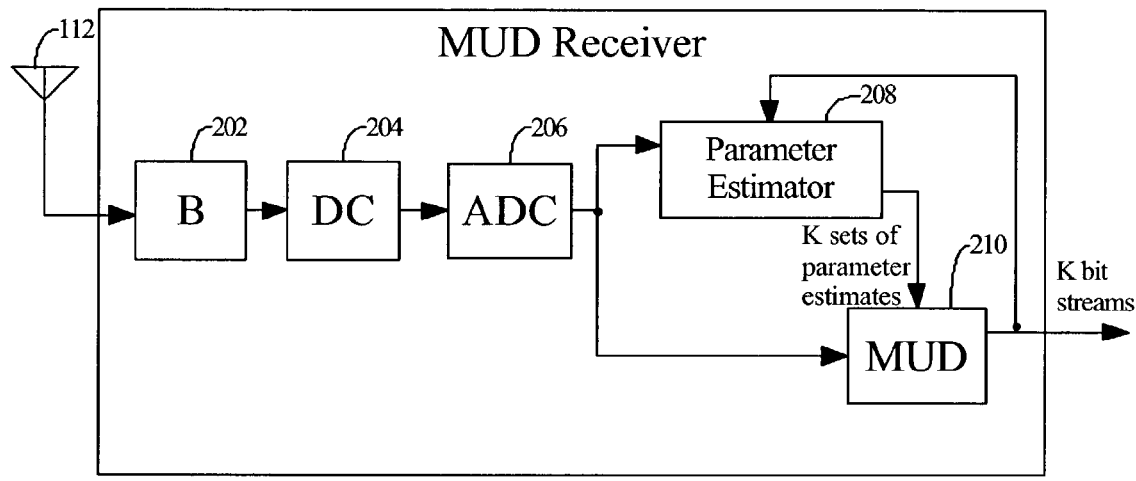
FIG. 2 is a more detailed block diagram of a typical (prior art) MUD-based receiver used in the system of FIG. 1.
Figure 2A:
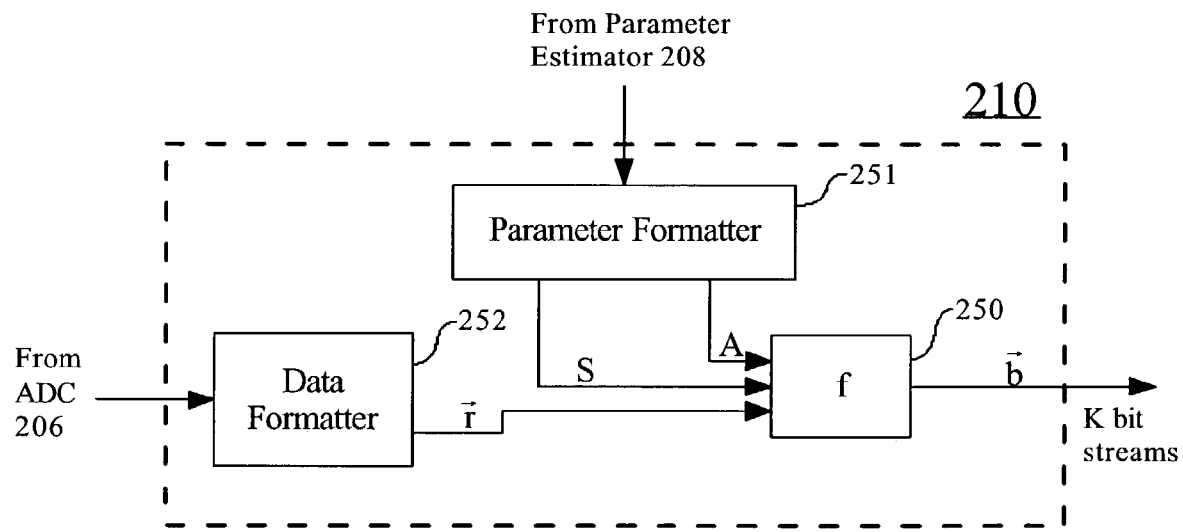
FIG. 2A is a more detailed block diagram of a typical (prior art) MUD detector of the MUD-based receiver used in the system of FIG. 1.

FIG. 2 illustrates a block diagram of a typical MUD-based receiver used in the system of FIG. 1. The magnitude and phase of the received signal via antenna 112 is affected by the complex receive antenna gain and complex gain of the electronics prior to the analog to digital converter 206. These gains are represented by "B" 202. Once the signals are received, they are transformed into digital signals by a down-converter 204 and an analog-to-digital converter 206, and split into two paths. The first path passes the digitized signal through to a parameter estimator 208 and the second passes it to the multi-user detector (MUD) 210. The function of the parameter estimator 208 is described in detail in U.S. patent application Ser. No. 10/228,787 filed Aug. 26, 2002, the entire teachings of which are hereby incorporated by reference. The parameter estimator 208 identifies and determines the parameters associated with each signal (parameter assignment set) that are required by the multi-user detector (MUD) 210 processing algorithm to jointly detect the bit or symbol streams conveyed on each of the interfering signals. These parameters might include the received power, the phase of the oscillator which generated each received signal relative to the receiver's oscillator, the timing offset relative to the receiver clock, the assigned spreading code, and the structure of multi-path replicas or channel transfer function for each transmitter. The received aggregate signal is in some fashion, depending on the form of Multiuser detector employed, compared to all possible aggregate signals that are expected given the known information about the modulation scheme for each user and the estimated signature signal for each user. The Multiuser Detection ("MUD") module 210, shown in more detail in FIG. 2A, declares a match between the received signal and a possible aggregate received signal that would have been comprised of the sum of K signals each with an information bit or symbol weight applied. Module 210 maps this matching to the set of K bits or symbols for each bit or symbol period and the resulting output is K streams of data bits. The K streams are estimates of the data transmitted by the K users. The MUD detection module 210 consists of a MUD engine 250, a parameter formatter 251, and a data formatter 252. The data formatter 252 selects N samples from the ADC 206 and creates vector $\vec{r} = [r(1), r(2), \ldots, r(N)]^t$. The parameter formatter 251 takes signature estimates for K users $\vec{s}_1, \vec{s}_2, \ldots, \vec{s}_k$ (each a waveform N samples long), and creates matrix $S = [\vec{s}_1, \vec{s}_2, \ldots, \vec{s}_k]$. It also takes K amplitude estimates ($a_1$ $a_2$ ... $a_k$) and makes $$\text{amplitude matrix } A = diag\{a_1 \ a_2 \ \ldots \ a_k\} = \begin{bmatrix} a_1 & 0 & 0 & \ldots & 0 \\ 0 & a_2 & 0 & \ldots & 0 \\ 0 & 0 & 0 & \ldots & a_k \end{bmatrix}.$$

Finally, the MUD engine 250 computes a vector of b bits (K by 1) based on data $\vec{r}$, signature matrix S, and amplitude matrix A. The diagram shown in FIG. 1 is an example for a typical MA system. The present invention assigns signal characteristics, resulting in additional influence over the set of possible received aggregate signals where each aggregate signal is the summation of each of the received signals (Sig 1-Sig K).

Figure 3:
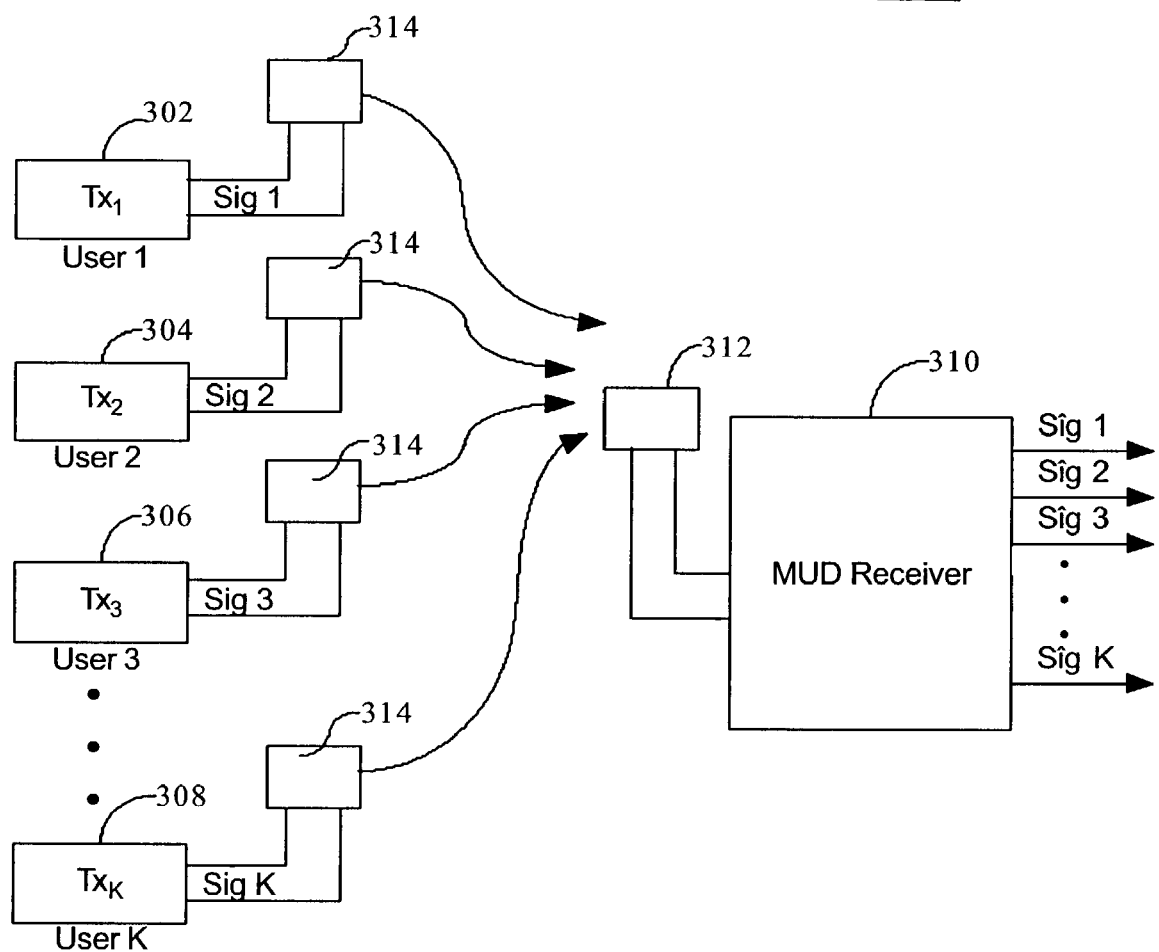
FIG. 3 is a block diagram of a co-channel MUD-based multi-access communication system according to a preferred embodiment of the present invention.

To enable a preferred embodiment of the present invention, the system must be modified as shown in FIG. 3 to allow transmission of different polarization ellipses. The method of assignment of transmitted powers and phases would allow for a suboptimal MUD algorithm, of which there are many to choose in the literature.

In the present invention, as shown in FIG. 3, incoming signals from the transmitters 302, 304, 306, 308 still arrive at the receiver 310, and are down converted and processed by the MUD 310 as in typical MUD-based multiple access communication systems. However, each signal now offers an advantage to a MUD processor in the form of unique signal characteristics to allow the MUD an advantage to detect and distinguish between all possible aggregate received signals. Now, each transmitter 302, 304, 306, 308 as well as the receiver 310 is equipped with a dual-polarized antenna 312, 314. Each antenna has two orthogonally polarized ports, hereinafter referred to as a vertical and a horizontal polarized port.

Figure 4:
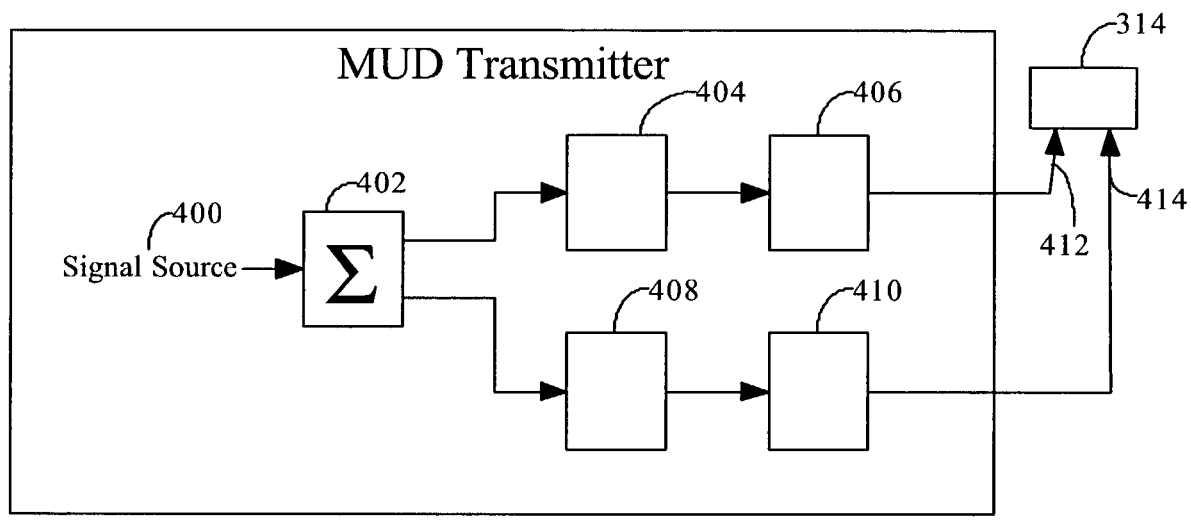
FIG. 4 is a more detailed block diagram of a MUD-based transmitter used in the system of FIG. 3, having dual-polarized antennas according to a preferred embodiment of the present invention.

FIG. 4 illustrates an exemplary MUD-based transmitter 302, 304, 306, 308 according to a preferred embodiment of the present invention. The dual-polarized antenna 314 contains a horizontal polarized port 412 and a vertical polarized port 414. Equivalently effective, one could employ right hand circular and left hand circular polarized ports, 412 and 414, respectively. Before a signal is transmitted, it is sent from the signal source 400 to a power divider 402 where it is split into two signals. From there, the signals are given predetermined amplitudes and phase angles relative to each other by a series of attenuators 404, 408 and phase shifters 406, 410. A specific polarization ellipse is created by the relative amplitude and phase of these two ports 412, 414.

The additional information about each incoming signal can be supplied by a number of different sources. For example, a base station that receives the signals can supply feedback to each transmitter. This control sequence could, for example, instruct each or all transmitters to transmit signals with a particular polarization, or particular amplitude. The instructions may be to increase the amplitude of one signal by 2 dB for example, and lower another by 1 dB. Or, the control sequence could instruct the users to transmit signals with randomly assigned amplitudes, or polarizations. Additionally, the transmitters themselves could initiate the control and provide random polarization, phase or amplitude. Each handset of a cellular telephone, for example, could contain an embedded computer chip, with software programmed to automatically change the amplitude of telephone's transmitted signal at a given time interval, resulting in a seemingly random and continually changing set of received signal powers and polarizations.

Figure 5:
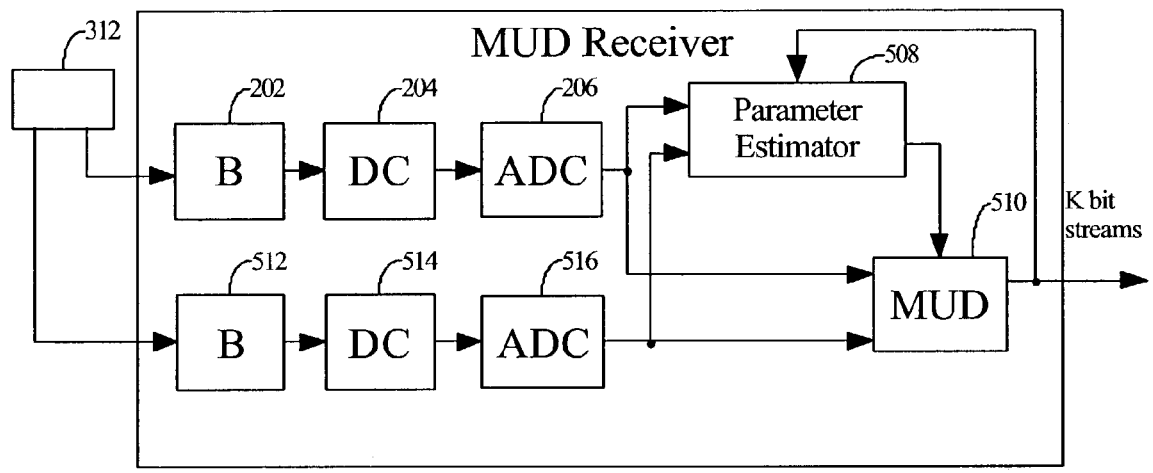
FIG. 5 is a more detailed block diagram of a MUD-based receiver used in the system of FIG. 3, having dual-polarized antennas according to a preferred embodiment of the present invention.
Figure 5A:
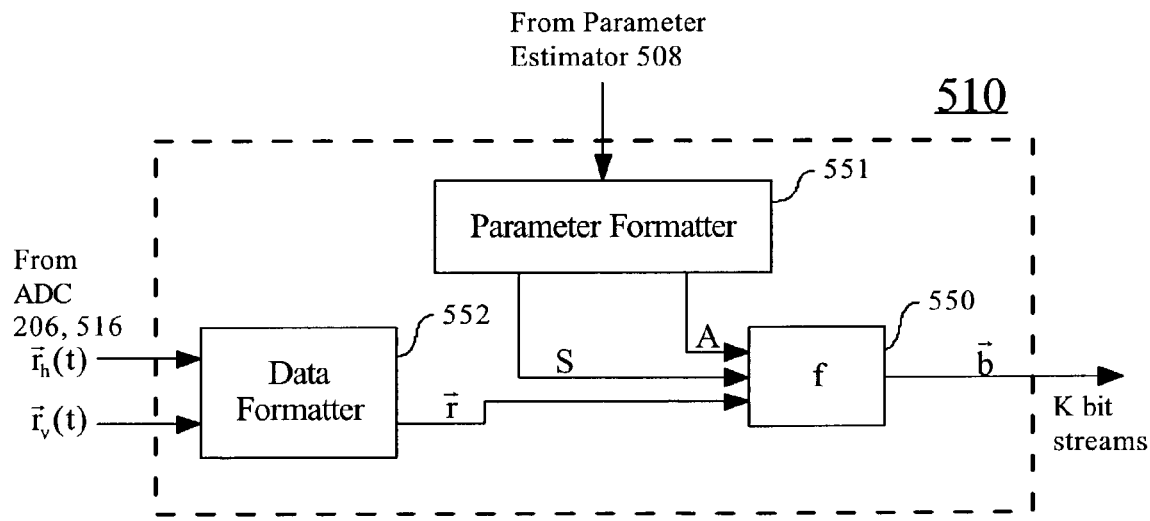
FIG. 5A is a more detailed block diagram of a MUD detector of the MUD-based receiver used in the system of FIG. 3, having dual-polarized antennas according to a preferred embodiment of the present invention.

In any of the above examples, the unique end result is the same: the MUD 310, shown in detail in FIG. 5, is very similar to the typical MUD-based receiver—it will still be receiving data signals, but will now have the ability to recognize each signal and perform a higher quality estimate with its original MUD processing procedure or perform an identical quality estimate with a reduced complexity MUD processing procedure in a much more streamlined fashion due to the additional number of dimensions of each detected signal caused by insuring that the set of received signals completely and independently span the 2-dimensional space of polarization. One skilled in the art of multiuser detection could choose or design the preferred type of MUD receiver for this module. The contribution unique to this invention is that the MUD receiver 310 will now require a dual-polarization antenna 312, also having a horizontal and vertical port, each port receiving an RF signal stream that is transformed into digital signals by a down-converter 204, 504 and an analog-to-digital converter 206, 506 and is passed through to a parameter estimator 508, and the multi-user detector (MUD) 510. Prior to down converter allocation 204 514 the RF signal stream is subjected to complex receive antenna gain and complex gain of the electronics shown as "B" 202, 512. The MUD detection module 510, shown in more detail in FIG. 5A, now consists of a MUD engine 550, a parameter formatter 551, and a data formatter 552. The parameter formatter 551 now gets 2 k waveforms $\vec{s}_{1v}$, $\vec{s}_{2v}, \ldots, \vec{s}_{kv}, \vec{s}_{1h}, \vec{s}_{2h}, \ldots, \vec{s}_{kh}$, and computes matrix $$S = \begin{bmatrix} \vec{s}_{1v} & \vec{s}_{2v} & \ldots & \vec{s}_{kv} \\ \vec{s}_{1h} & \vec{s}_{2h} & \ldots & \vec{s}_{kh} \end{bmatrix}$$

and amplitude matrix A=[diag $\{a_{1v}\ a_{2v} \ldots a_{kv}\}$ diag $\{a_{1h}\ a_{2h} \ldots a_{kh}\}$] as before. The data formatter 552 now gets two signals from the horizontally and vertically polarized MUD receiver. The formatter 552 arranges the data as:

$$\vec{r}_h = [r_h(1) r_h(2) \ldots r_h(N)]^t,\ \vec{r}_v = [r_v(1) r_v(2) \ldots r_v(N)]^t$$

and outputs:

$$\vec{r}_h = \begin{bmatrix} \vec{r}_h \\ \vec{r}_v \end{bmatrix}.$$

The MUD 510 will also realize better performance due to the power differences of each of the received signals since the received signal constellation will be less packed near zero. The signal constellation represents all the ways the K signals can combine at the receiver, e.g. the set of all possible received voltage values corresponding to all possible combinations of the digital data for each bit instance. Instead of having to eliminate one or more users within a frequency channel in order to reduce unwanted signal interference, the present invention allows the number of users to remain the same or actually increase.

Multiuser detection (MUD) techniques allow more than one signal to share the same frequency space, without degraded performance. The use of polarization diversity or amplitude diversity, in coordination with these techniques, improves the bit error rate by effectively increasing the distance between constellation points.

Figure 6:
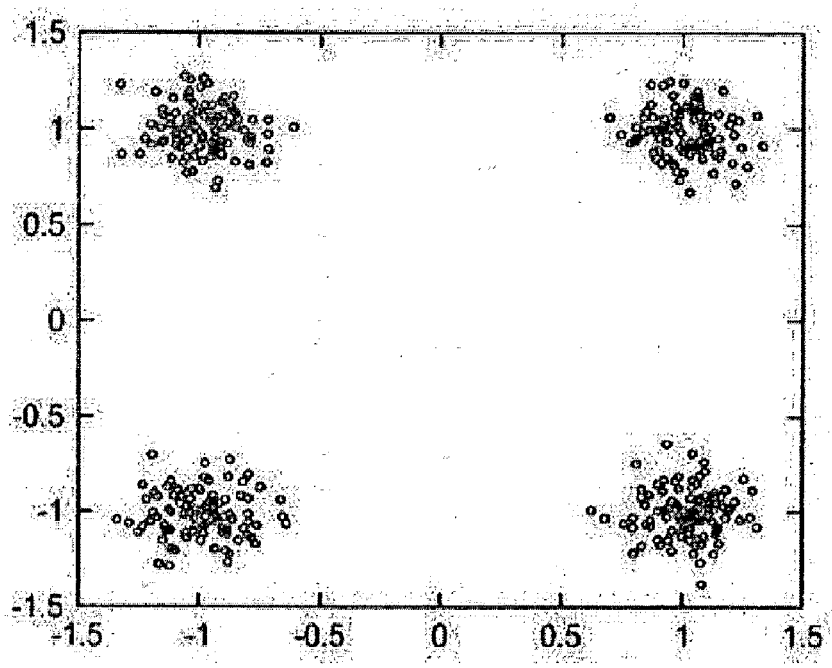
FIG. 6 is an exemplary received constellation of a QPSK constellation for a single user.

FIG. 6 shows a quadrature phase shift-keying (QPSK) constellation 600 for a single user case. In this case, the four QPSK symbols are easily distinguishable from each other. The noise spreads out what would normally be four discrete points into four clouds, none of which are overlapping, so that the probability of mistaking one symbol for another is low.

Figure 7:
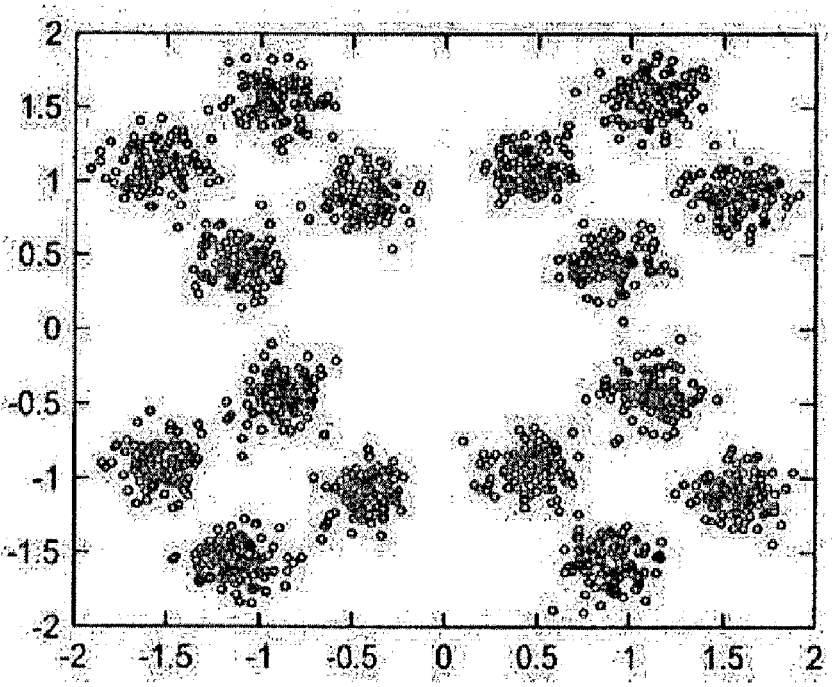
FIG. 7 is an exemplary received voltage plot of the received constellation for two simultaneous users utilizing QPSK modulation and sharing the same frequency band.

In FIG. 7, two QPSK signals share the same frequency band. Now, the constellation 700 contains 16, instead of 4 points. The points are now closer together and will therefore be more difficult for a demodulator to correctly demodulate. Relative to the single user scenario the bit error rates for each of the two users will degrade due to the presence of the co-channel interference. However, these points can be moved further apart through the use of polarization diversity.

Figure 8:
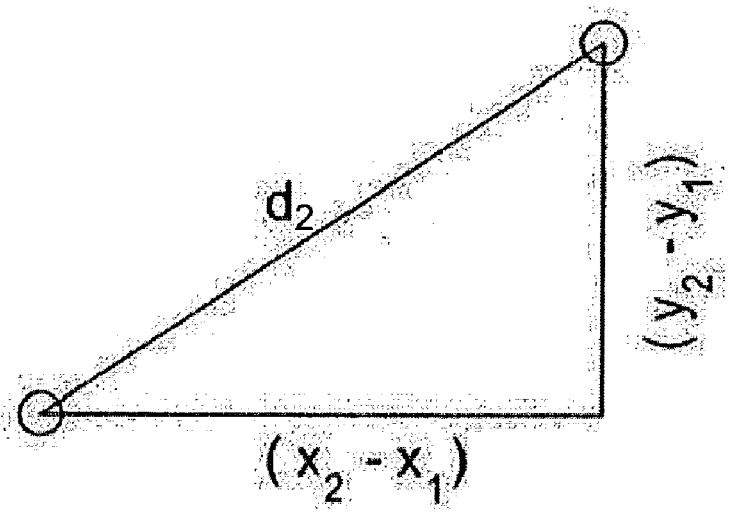
FIG. 8 is a graphical illustration showing the benefits of increasing the number of dimensions of a transmitted signal in relation to the number of users in a multi-access communications system utilizing the present invention.
Figure 8:
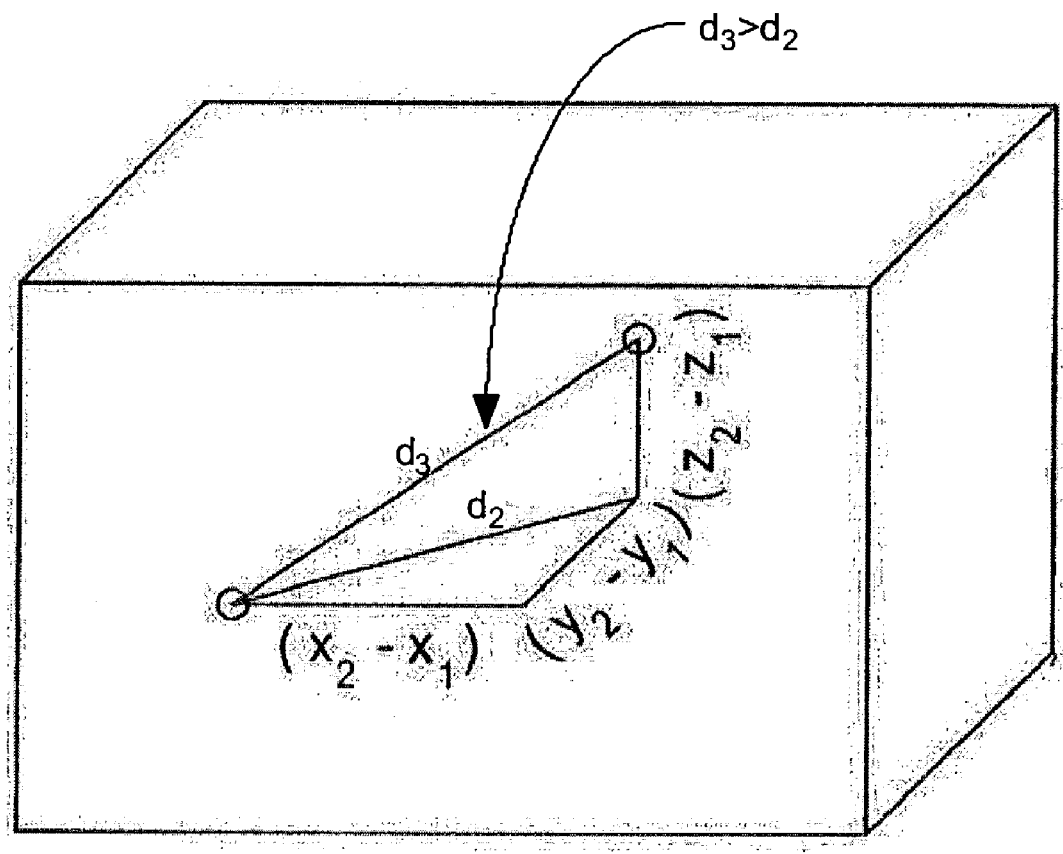

Referring to FIG. 8, two geometrical illustrations 800 are shown and it is easy to see how an increase in the number of dimensions can increase the "distance" between signals thereby allowing the signals to more easily distinguished. As shown in FIG. 8, the distance between any two constellation points in 2 dimensions is:

$$d_2^2 = (x_2-x_1)^2 + (y_2-y_1)^2.$$

The first illustration shown in FIG. 8 could be considered to be a projection of the two points from a three (or higher) dimensional space, onto a plane. If the same two points are viewed in three-dimensional space, as shown in the second illustration in FIG. 8, it is seen that the distance between them is increased to:

$$d_3^2 = (x_2-x_1)^2 + (y_2-y_1)^2 + (z_2-z_1)^2$$

The increase in distance between the constellation points results in a better bit error rate (BER) for practically any choice for the MUD in 310. This increase is the result of increasing the number of dimensions in the signal space.

Figure 9:
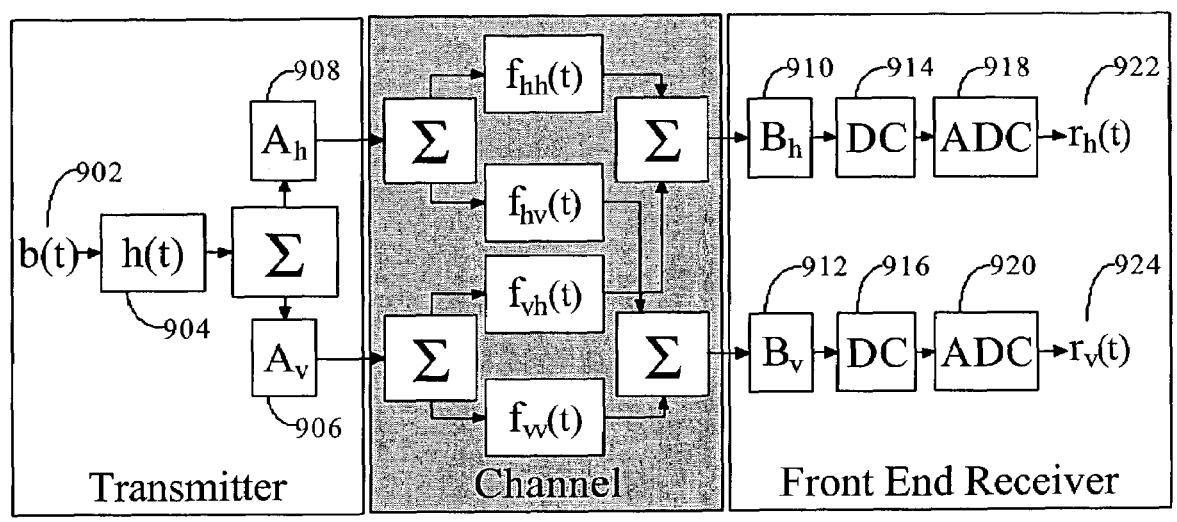
FIG. 9 is a block diagram of a MUD-based multi-access communications system utilizing a single transmitter with a preferred dual polarization alignment embodiment of the present invention.

FIG. 9 is a block diagram 900 illustrating the transmitter, channel and front end receiver in a preferred embodiment of the present invention using a single transmitter having a dual polarization. In one embodiment of the invention, a polarization alignment is assigned to each transmitted signal. In another embodiment, each transmitter in the system sends a signal with a randomly chosen polarization alignment. One can increase the number of dimensions by a factor of 2 by using polarization diversity in this maimer. Referring to FIG. 9, the vector b(t) 902, contains samples of the symbol stream. In the Binary Phase Shift Keying (BPSK) case, its elements are +/−1. The b(t) vector 902 is passed trough a pulse shaping filter, h(t) 904, and split into two separate paths for transmission, the left hand circular and right hand circular (or horizontal and vertical) polarization ellipses associated with the orientation of the transmitter antenna relative to the set of receiver antennas. $A_v$ 906 and $A_h$ 903 are complex scalars that encapsulate the gain of the horizontal and vertical ports of the transmitter (including the antenna). Likewise, $B_v$ 912 and $B_h$ 910 are for the receiver. The four channel functions act like filters due to multipath and scattering effects. There is energy transfer between horizontally polarized and vertically polarized energy due to multipath and scattering. The received signals are down converted 914, 916 and digitized by an analog-to-digital converter 918, 920, resulting in two complex baseband received voltage vectors, $r_h(t)$ 922 and $r_v(t)$ 924, from the horizontal and vertical pods. Computer simulations of the system shown in FIG. 9 have demonstrated an improvement of more than 30 dB over non-diverse MUD systems, and even greater improvement when higher orders of diversity are used.

Figure 10:
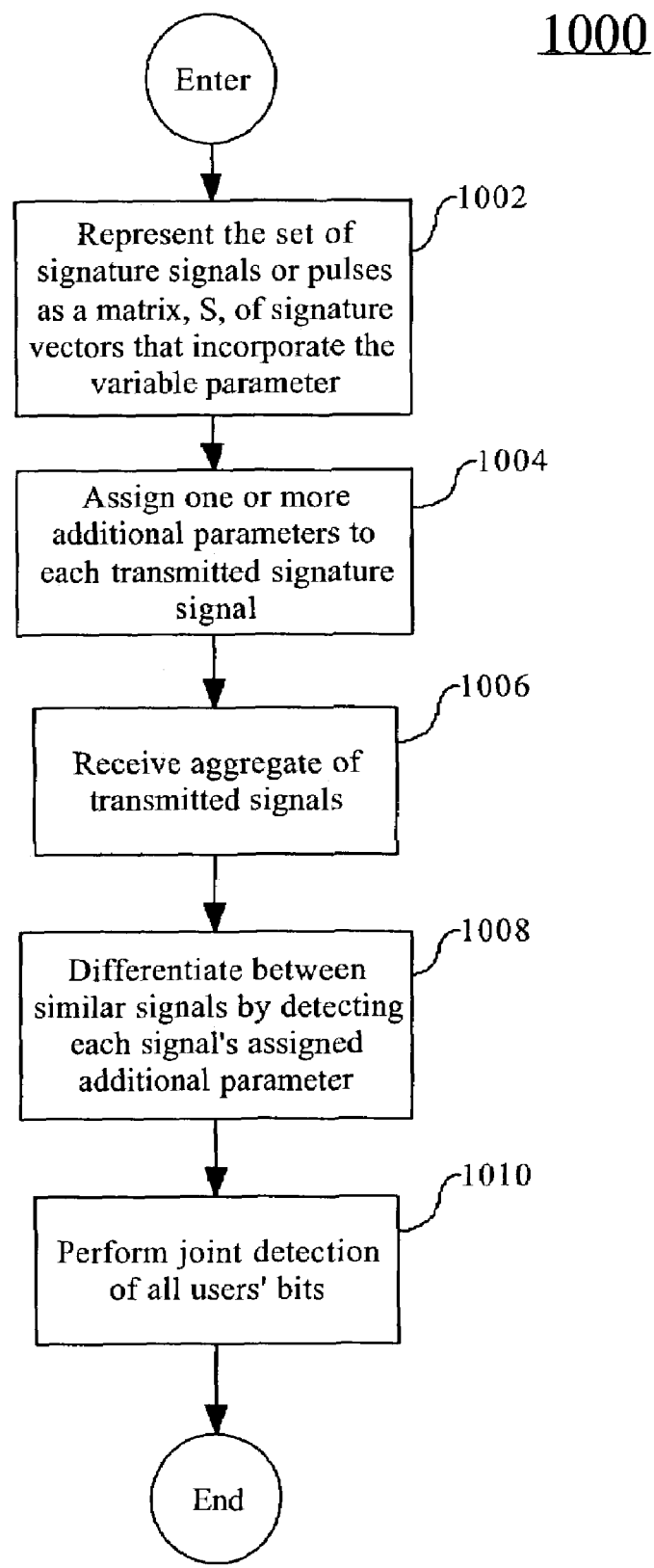
FIG. 10 is an operational flow diagram describing an exemplary operational sequence of the MUD-based multi-access communications system of FIG. 3, according to a preferred embodiment of the present invention.

The method for increasing throughput in a multiuser detection based multiple access communications system 1000 of the present invention, as shown in FIG. 10, begins, in step 1002, by representing the set of signature signals or pulses as a matrix, S, where each column of elements fully represents a user's signature pulse, which encompasses all of the signal parameters associated with that user. Then, either after analysis or in an uninformed adhoc fashion, assigns the specific value or change in one or more of the parameters that can be controlled by the transmitter, at step 1004. At step 1006 the aggregate of the actual transmitted signals after they have traveled through the channel are received, now including the controlled parameter or parameters. At step 1008, detecting each signal's assigned additional parameter differentiates similar signals. Finally, at step 1010, a multiuser detection processing procedure is performed that uses as input for the expected possible received signals, the S matrix, which incorporates the estimated set of parameters for each user, both uncontrolled and controlled. As is likely the ease in wireless communications, each transmitted signal travels though a unique channel, largely due to the unique set of physical structures that lie between the transmitter and receiver, causing a unique set of multiple paths for each transmitted signal to travel. If the transmitted signals are in any way altered due to channel effects, the column vectors representing the user signature pulses, the columns in S, will be taken to represent the set of received signature signals.

The received signal vectors, $r_h(t)$ and $r_v(t)$, are used to estimate the transmitted symbols. It can be seen from the simple, single transmitter case shown in FIG. 9 that $$r_h(t) = b(t) \otimes h(t) \otimes [A_h f_{hh}(t) + A_v f_{vh}(t)] B_h$$

and $$r_v(t) = b(t) \otimes h(t) \otimes [A_v f_{vv}(t) + A_h f_{hv}(t)] B_v$$

where the symbol $\otimes$ stands for the convolutional operator.

Letting $$s_h(t) = h(t) \otimes [A_h f_{hh}(t) + A_v f_{vh}(t)] B_h$$

and $$s_v(t) = h(t) \otimes [A_v f_{vv}(t) + A_h f_{hv}(t)] B_v$$

then $r_h(t) = b(t) \otimes s_h(t)$ and $r_v(t) = b(t) \otimes s_v(t)$, therefore r=Sb, where $$r \equiv \begin{bmatrix} r_h \\ r_v \end{bmatrix}, \quad b \equiv \begin{bmatrix} b[1] \\ b[2] \\ \vdots \\ b[N] \end{bmatrix}, \quad \text{and } S \equiv \begin{bmatrix} S_h \\ S_v \end{bmatrix}.$$

$S_h$ and $S_v$ are convolutional matrices formed from $S_h(t)$ and $S_h(t)$, respectively. The transmitted signal uses known symbols during part of the transmission. These known symbols are used to solve r=Sb for S. Then, during periods where unknown symbols are being transmitted, r=Sb is solved for the unknown "b" symbols.

When polarization diversity is used, there are twice as many equations, with the same number of unknowns as compared to the case. The doubling of the number of equations while keeping the number of unknowns constant makes the solution of the equation easier, resulting in a number of options for system improvements. The system may now be designed so that the process can be less computationally complex, or the bit error rate may be lower, or the system may operate at a higher signal to interference plus noise ratio. One skilled in the state of the art of multiuser detection could choose or design any number of MUD-based processing procedures where regardless of the choice of the type of MUD, the MUD would work much better in the situation resulting from employment of this invention than in the situation where this invention were not employed.

When creating a signal model using a matrix to represent the user-received waveforms, S, the rank of S determines the number of dimensions. When the model is expanded to include two S matrices, one stacked upon the other, each due to a different receiver port (co-pol and cross-pol), the rank of the new signal matrix could be up to twice as large as the original single polarization measurement. The way this invention ensures the maximum increase in dimension is done in either of two ways: 1) assign polarization ellipses in a feedback communication loop between a controller or base station and the transmitters, or 2) instruct the transmitters to choose polarization ellipses at random. In some cases the rank of the original S matrix, corresponding to all users transmitting with the same polarization, is smaller than the number of users (or, equivalently, the number of columns in S). This case presents a difficult problem to solve in the MUD. However, once the two S matrices are stacked, the new rank is significantly increased (up to twice as much), sometimes resulting in a rank that is larger than the number of signals, allowing for very computationally simple MUD algorithms to work well. The transmitted signals need not be coordinated to get the maximum doubling of rank (dimensions). They must simply have polarizations that are not all alike, hence, a uniform random distribution of polarizations is fine and can be achieved by random or uncoordinated selection of the transmit polarization in each transmitter.

Additional users can be allowed to simultaneously access a MUD-based multiple access system of interfering users simply by making all users transmit with an arbitrarily chosen (randomly chosen) polarization. The receiver must collect with both polarization ports. Therefore, the received digitally converted signal is changed from a two-vector set of samples at each time instant (one for inphase and one for quadrature measurements) to a four-element vector set of samples, one for each time instant (inphase for the co-pol, inphase for the cross-pol, quadrature for the co-pol and quadrature for the cross-pol). Multiuser detectors are all easily extended to work with any number of dimensions in the received signal stream. For example, a CDMA system requires each transmitter to use a direct sequence spread spectrum signature pulse; the set of all signature pulses, one corresponding to each transmitter, span a space having dimensions as high as twice the number of chips in the signature pulse. No change to the MUD processing is required for narrow band or wide band digital communication systems utilizing this invention as long as the MUD algorithm has the knowledge that polarization has been included in the received signature vectors for each user.

Figure 11:
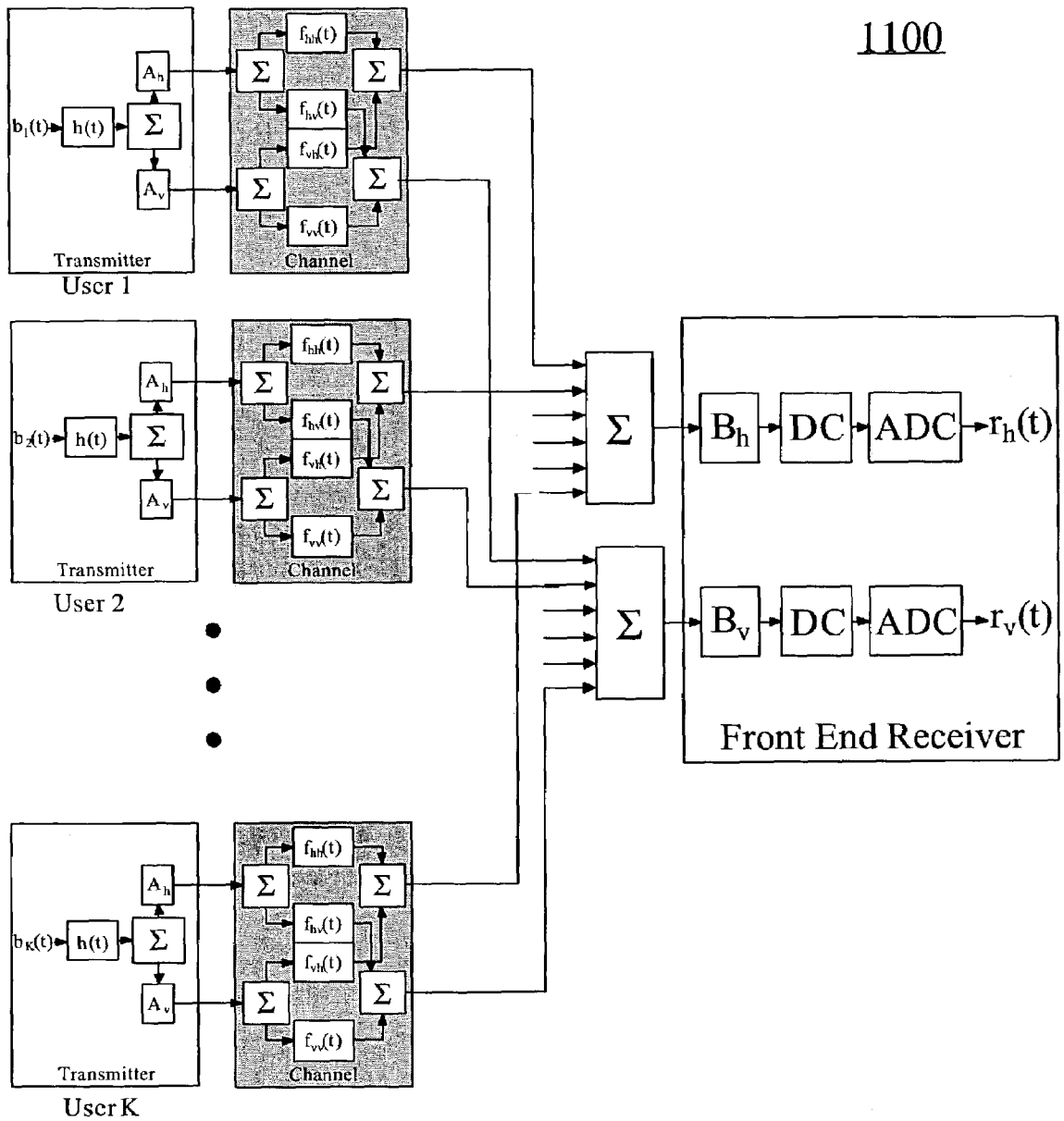
FIG. 11 is a block diagram of a MUD-based multi-access communications system utilizing multiple transmitters with the preferred dual polarization alignment embodiment of the present invention.

FIG. 11 is a block diagram 1100 and another representation of multiple users transmitting signals to a single receiver (base station). Again, it is evident mat heavy interference exists. In this scenario, one receiver receives the signals from all of the users. Once again, User 1 through User K represent transmitters. Each transmits a signal that is split into two paths, "horizontal" and "vertical", for transmission. As in the single transmitter case, each signal is passed through a channel function, which acts as a filter due to multipath and scattering effects. The signals can be transmitted via traditional data communication media, including wireless means such as cell phones or satellite, or via cable. The signals could even be stored on a shared medium such as a disk drive; the interference in this case would result from locating the signals too closely together in space on the shared medium. Signals in similar frequency bands can interfere and create noise by the time they are detected at the receiver end. The signals are combined and received by the horizontal and vertical ports of the base station.

In an alternate embodiment of the present invention, each user signal's amplitude can be controlled to vary so that the demodulation of more simultaneous users is possible, even if the polarizations are not controlled or made to be arbitrary to one another.

To apply the amplitude assignment embodiment of the invention to an existing (up to fully loaded) communications network, a digitally modulated transmitter (a user) is provided and is paired to a second additional user. For example, in a TDMA system, the second user is assigned the exact same timeslot on the exact same frequency as the first user. To allow the multi-user detector a decision-making advantage, the users' received powers are intentionally made to be different, e.g. one louder and the second softer, in amplitude. By examining the demodulation of these two users at the receiver by an optimal multi-user detector, it can be shown that both users could be successfully demodulated, even with identical received signature pulses.

Multiuser information theory predicts that for a direct sequence spread spectrum system like that used for the IS-95 cell phone system, even in the absence of noise, the maximum number of equal energy, rate 1, users per dimension is bounded by 3. This bound is entirely due to the fact that when overloading a signal space with interfering users, the different joint hypotheses that the optimal MUD must compare become very close in Euclidean distance and are virtually indistinguishable when the loading is greater than 3. The same phenomenon is seen for a larger number of users per dimension when the user amplitudes are not identical. This means that a multi-user detection based system of highly interfering users can be improved upon by paying attention to the received powers in the assignment of users to channels.

The present invention may be implemented in numerous applications such as satellite systems, cell phone systems, military operations, and wired or wireless local area networks. An exemplary scenario contains several transmitters and several receivers, and each receiver is interested in the information sent by one user only. This scenario has a commercial analog, namely the wireless office in which all electronic devices communicate via wireless signals as opposed to the legacy Ethernet method. In these scenarios it can be more easily seen that receivers that cannot accurately detect and decode information associated with a particular user due to heavy interference can lead to failure of the system. For the electronic-based workplace scenario, such a failure would mean a work stoppage or severe slowdown requiring that less equipment co-exist together or that more bandwidth be obtained to accommodate all the signals that must share the airwaves.

By exploiting the properties of a multiuser detector and creating a situation wherein interfering signals have different polarization alignments and/or different user amplitudes, either because of direct controller assignment or because users are made to operate in random dynamic transmission mode, the number of simultaneous users that can transmit information without performance degradation will increase. These properties extend in a very general manner to more complicated signaling scenarios where users may be partially overlapping in one or more of the system design parameters. For example, the interfering signals need not all be alike in that some may employ differential phase shift keying while others employ quadrature shift keying. Additionally, not all signals are required to transmit similar signature pulses or transmit at similar symbol rates. For example some signals may have narrow band signature pulses such as the root raised cosine pulse used in many TDMA systems, and other users may have a direct sequence spread spectrum pulse comprised of several chip waveforms in a row, such as is used in BAR Systems'® CDMA cellular IS-95 system. The only requirement for MIID and for this invention in conjunction with MUD is that users must employ digital modulation. In other words, power and polarization packing of users in an FM or AM system is not addressed by this invention.

The advantage of the present invention can be easily seen in a cellular telephone system. For example, if an interference intentional system already employs a MUD and three users are transmitting signals on the same channel, all available time slots are filled and a fourth user will not be able to send a signal in any of the time slots and will instead receive a busy signal. This is because the MUD will not be able to recognize this fourth signal due to heavy interference with the other three similar signals. However, if, prior to transmission, all four users' signals are modified to include an "additional" feature, i.e. a unique polarization, and/or a unique amplitude level, the MUD will be advantaged by the lowering of the receive constellation density and will be able to detect the three original signals as well as this fourth signal. Furthermore, if all of the users' signals submitted to having polarization and/or power controlled according to any of the following methods, then it may even be possible to allow six or more users to share the same frequency and time slot:

1) The controller can calculate an optimum assignment of transmitter polarizations and amplitudes to increase the Euclidean distance among all possible received aggregate signals,
2) The controller tells all the users to randomly choose their transmit amplitudes and polarizations. The controller could then tell a poorly received user or a user deemed to be the cause of the poor reception to change its amplitude and/or polarization either specifically or arbitrarily.
3) All users operate in random dynamic mode in which users arbitrarily choose their polarizations and amplitudes for transmission and vary these values at a rate that is advantageous to the parameter estimation/tracking preprocessor to the MUD.
4) All users, or the controller, choose their polarizations and amplitudes for transmission from a predetermined rule, set of values, or an algorithm, including psuedorandom choices.

The present invention can be realized in hardware, software, or a combination of hardware and software. Any kind of computer system—or other apparatus adapted for carrying out the methods described herein—is suited.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for increasing the throughput of a multi-user detection-based multiple access communications system, said system comprised of at least one transmitter for transmitting data signals and at least one corresponding receiver, the method comprising the steps of:

representing each signature waveform corresponding to each said transmitted signal as a vector of values dependent upon several parameters;

assigning the value of at least one of said parameters to each said transmitted signal;

transmitting said transmitted signal via a dual polarized transmission antenna;

incorporating a horizontal polarized port and a vertical polarized port in said dual polarized transmission antenna;

receiving said transmitted signals via a dual polarized reception antenna;

incorporating a horizontal polarized port and a vertical polarized port in said dual polarized receiving antenna;

assigning polarization ellipses in a feedback communication loop between a controller and the at least one transmitter;

differentiating between similar signals by detecting each signal's set of parameters, both those assigned and those left to physical circumstance; and jointly detecting data streams associated with each of the signals using a multiuser detection (MUD) processing scheme, the MUD processing scheme having been advantaged by the assignment of said parameters for each transmitted signal.

2. The method of claim 1 wherein the value of said at least one assigned parameter is randomly chosen.

3. The method of claim 1 wherein the value of said at least one assigned parameter is chosen from a predetermined parameter assignment set.

4. The method of claim 1 wherein the value of said at least one assigned parameter is chosen from a set of parameter assignments calculated to be optimal, given the current measurements of received signals, bit error rates, and estimated signal parameters.

5. The method of claim 1 wherein the value of said at least one parameter is varied after a given time interval.

6. The method of claim 1 wherein the value of said at least one parameter is continually varied.

7. The method of claim 1 wherein the value of said at least one assigned parameter is assigned by a centralized controller.

8. The method of claim 1 wherein the value of said at least one assigned parameter is controlled by a centralized controller.

9. The method of claim 1 wherein the value of said at least one assigned parameter is assigned by one of said transmitters.

10. The method of claim 1 wherein the value of said at least one assigned parameter is chosen by each corresponding transmitter according to one of a predetermined rule, set, and algorithm, including a pseudo-random choice.

11. The method of claim 10 wherein the value of said at least one parameter is varied after a given time interval.

12. The method of claim 10 wherein the value of said at least one parameter is continually varied.

13. The method of claim 1 wherein said at least one assigned parameter is a polarization ellipse.

14. The method of claim 1 wherein said at least one assigned parameter is signal amplitude level.

15. A multi-user detection-based multiple access communications system comprising:
at least one transmitter for transmitting signals;
a dual polarized transmission antenna included in each at least one transmitter;
a horizontal polarized port and a vertical polarized port incorporated in said dual polarized transmission antenna;
polarization ellipses in a feedback communication loop between a controller and the at least one transmitter;
means for assigning at least one parameter to each said transmitted signal;
at least one receiver, each said receiver adapted to estimate the signal from said at least one transmitter, wherein each received signature signal corresponding to each said transmitted signal is represented as a vector of values dependent on several parameters;
a dual polarized reception antenna included in each at least one receiver;
a horizontal polarized port and a vertical polarized port incorporated in said dual reception polarized antenna;
means for identifying each said transmitted signal as being distinct from each other said transmitted signal by its said assigned as welt as non-assigned parameters; and
means for detecting all data streams, one stream for each interfering user, wherein a model for each user's received signal is employed to advantage the detection.

16. The system of claim 15 wherein the value of said at least one assigned parameter is randomly chosen.

17. The system of claim 15 wherein the value of said at least one assigned parameter is chosen from a predetermined parameter assignment set.

18. The system of claim 15 wherein the value of said at least one assigned parameter is chosen from a set of values calculated to be optimal, given the current measurements of received signals, bit error rates, and estimated signal parameters.

19. The system of claim 15 wherein the value of said at least one parameter is varied after a given time interval.

20. The system of claim 15 wherein the value of said at least one parameter is continuously varied.

21. The system of claim 15 wherein the value of said at least one assigned parameter is assigned by a centralized controller.

22. The system of claim 15 wherein the value of said at least one assigned parameter is controlled by a centralized controller.

23. The system of claim 15 wherein the value of said at least one assigned parameter is assigned by one of said transmitters.

24. The system of claim 15 wherein the value of said at least one assigned parameter is chosen by each corresponding transmitter according to one of a predetermined rule, set, and algorithm, including a pseudo-random choice.

25. The system of claim 24 wherein the value of said at least one parameter is varied after a given time interval.

26. The system of claim 24 wherein the value of said at least one parameter is continuously varied.

27. The system of claim 15 wherein said at least one assigned parameter is a polarization ellipse.

28. The system of claim 15 wherein said at least one assigned parameter is signal amplitude level.

29. A computer readable medium comprising computer instructions for increasing the throughput of a multi-user detection-based multiple access communications system, said system comprised of at least one transmitter for transmitting data signals and at least one corresponding receiver, the computer readable medium comprising instructions for performing the steps of:
representing each signature waveform corresponding to each said transmitted signal as a vector of values dependent upon several parameters;
assigning the value of at least one of these parameters to each said transmitted signal;
transmitting said transmitted signal via a dual polarized transmission antenna;
incorporating a horizontal polarized port and a vertical polarized port in said dual polarized transmission antenna;
assigning polarization ellipses in a feedback communication loop between a controller and the at least one transmitter;
receiving said transmitted signals via a dual polarized reception antenna;
incorporating a horizontal polarized port and a vertical polarized port in said dual polarized receiving antenna;
receiving said transmitted signals;
detecting each signal's set of parameters, both those assigned and those left to physical circumstance; and
jointly detecting data streams associated with each of the signals using a multiuser detection (MUD) processing scheme, the MUD processing scheme having been advantaged by the assignment of said parameters for each transmitted signal.

30. The computer readable medium of claim 29 wherein the value of said at least one assigned parameter is randomly chosen.

31. The computer readable medium of claim 29 wherein the value of said at least one assigned parameter is chosen from a predetermined parameter assignment set.

32. The computer readable medium of claim 29 wherein the value of said at least one assigned parameter is chosen from a set of parameter assignments calculated to be optimal, given the current measurements of received signals, bit error rates, and estimated signal parameters.

33. The computer readable medium of claim 29 wherein the value of said at least one parameter is varied after a given time interval.

34. The computer readable medium of claim 29 wherein the value of said at least one parameter is continuously varied.

35. The computer readable medium of claim 29 wherein the value of said at least one assigned parameter is assigned by a centralized controller.

36. The computer readable medium of claim 29 wherein the value of said at least one assigned parameter is controlled by a centralized controller.

37. The computer readable medium of claim 29 wherein the value of said at least one assigned parameter is assigned by one of said transmitters.

38. The computer readable medium of claim 29 wherein the value of said at least one assigned parameter is chosen by each corresponding transmitter according to one of a predetermined rule, set, and algorithm, including a pseudo-random choice.

39. The computer readable medium of claim 38 wherein the value of said at least one parameter is varied after a given time interval.

40. The computer readable medium of claim 38 wherein the value of said at least one parameter is continuously varied.

41. The computer readable medium of claim 29 wherein said at least one assigned parameter is a polarization orientation.

42. The method of claim 29 wherein said at least one assigned parameter is signal amplitude level.

43. A method for increasing the throughput of a multi-user detection-based multiple access communications system, said system comprised of at least one transmitter for transmitting data signals and at least one corresponding receiver, the method comprising the steps of:
representing each signature waveform corresponding to each said transmitted signal as a vector of values dependent upon several parameters;.
assigning the value of at least one of said parameters to each said transmitted signal;
transmitting said transmitted signal via a dual polarized transmission antenna;
incorporating a horizontal polarized port and a vertical polarized port in said dual polarized transmission antenna;
receiving said transmitted signals via a dual polarized reception antenna;
incorporating a horizontal polarized port and a vertical polarized port in said dual polarized receiving antenna;
instructing the transmitters to choose polarization ellipses at random; differentiating between similar signals by detecting each signal's set of parameters, both those assigned and those left to physical circumstance; and
jointly detecting data streams associated with each of the signals using a multiuser detection (MUD) processing scheme, the MUD processing scheme having been advantaged by the assignment of said parameters for each transmitted signal.

44. A multi-user detection-based multiple access communications system comprising:
at least one transmitter for transmitting signals;
a dual polarized transmission antenna included in each at least one transmitter;
a horizontal polarized port and a vertical polarized port incorporated in said dual polarized transmission antenna;
randomly chosen polarization ellipses in a feedback communication loop between a controller and the at least one transmitter;
means for assigning at least one parameter to each said transmitted signal;
at least one receiver, each said receiver adapted to estimate the signal from said at least one transmitter, wherein each received signature signal corresponding to each said transmitted signal is represented as a vector of values dependent on several parameters;
a dual polarized reception antenna included in each at least one receiver
a horizontal polarized port and a vertical polarized port incorporated in said dual polarized reception antenna;
means for identifying each said transmitted signal as being distinct from each other said transmitted signal by its said assigned as well as non-assigned parameters; and
means for detecting all data streams, one stream for each interfering user, wherein a model for each user's received signal is employed to advantage the detection.

45. A computer readable medium comprising computer instructions for increasing the throughput of a multi-user detection-based multiple access communications system, said system comprised of at least one transmitter for transmitting data signals and at least one corresponding receiver, the computer readable medium comprising instructions for performing the steps of:
representing each signature waveform corresponding to each said transmitted signal as a vector of values dependent upon several parameters;
assigning the value of at least one of these parameters to each said transmitted signal;
transmitting said transmitted signal via a dual polarized transmission antenna;
incorporating a horizontal polarized port and a vertical polarized port in said dual polarized transmission antenna;
randomly choosing polarization ellipses in a feedback communication loop between a controller and the at least one transmitter;
receiving said transmitted signals via a dual polarized reception antenna; incorporating a horizontal polarized port and a vertical polarized port in said dual polarized receiving antenna;
receiving said transmitted signals;
detecting each signal's set of parameters, both those assigned and those left to physical circumstance; and
jointly detecting data streams associated with each of the signals using a multiuser detection (MUD) processing scheme, the MUD processing scheme having been advantaged by the assignment of said parameters for each transmitted signal.

* * * * *